UNITED STATES PATENT OFFICE.

AUGUST BREUER, OF ISERLOHN, GERMANY.

DIAPHRAGM USED IN ELECTROLYTICAL PROCESSES.

SPECIFICATION forming part of Letters Patent No. 508,084, dated November 7, 1893.

Application filed September 14, 1892. Serial No. 445,882. (No specimens.) Patented in England November 14, 1891, No. 19,775; in Belgium November 14, 1891, No. 97,197; in France November 14, 1891, No. 217,440; in Italy December 31, 1891, XXVI, 30,763, LX, 243, and in Austria-Hungary July 10, 1892, No. 6,942 and No. 25,346.

*To all whom it may concern:*

Be it known that I, AUGUST BREUER, a subject of the King of Prussia, residing at Iserlohn, Germany, have invented certain new and useful Improvements in and Relating to Diaphragms Employed in Electrolytical Processes, (for which I have obtained Letters Patent in England, dated November 14, 1891, No. 19,775; in Austria-Hungary, dated July 10, 1892, No. 6,942 and No. 25,346; in Belgium, dated November 14, 1891, No. 97,197; in France, dated November 14, 1891, No. 217,440, and in Italy, dated December 31, 1891, Vol. XXVI, No. 30,763, Vol. LX, No. 243;) and I do hereby declare the following to be a full, clear, and exact description of the invention, such as will enable others skilled in the art to which it appertains to make and use the same.

The invention has relation to diaphragms employed in apparatus for electrolytical processes in the construction of which apparatus various materials have heretofore been used, such as parchment paper, natural or artificial animal hide or bladder, and analogous organic materials. When, however a caustic reaction or a production of halogen elements takes place in the electrolite, these substances are not available, and it is necessary to employ a diaphragm constructed of a material capable of resisting such action. To this end diaphragms heretofore and now used are made of clay or earthenware or plaster of paris, or of material of similar quality. It is well known that the porosity of such diaphragms, *e. g.* cells or cups, of such material is soon destroyed under the influence of caustic liquids whenever caustic bodies or substances or halogen elements are present or formed in the electrolyte; this is especially the case in the electrolytical decomposition of solutions of the chlorides of the alkalies, so that the diaphragms become worthless in a comparatively short time.

Experiments intended to substitute the above named materials by cement proved to be a failure, cement as such too, losing in a shorter time yet than porous clay, &c., its porosity. Yet there was noticed by experiments, that cement not only showed an almost complete resistance to the action of the alkaline solutions, but also that it withstood the influence of the halogen elements. On the base of such experiences it appears to be desirable to convert the cement into a material sufficiently porous to make it fit for the service as diaphragm in electrolytic decomposition tanks. For this purpose I have found to make advantageously the diaphragms either of natural or artificial cement or of lime or magnesia cement and impart to them the proper degree of porosity by mixing with the said cement in suitable proportions soluble materials as for instance soluble salts and other materials, which after the hardening of the cement mass were removed, say by means of caustic alkali or halogen (such as chlorine), produced in an electric decomposition chamber, or by using other chemicals or solvents (such as water), in order to lixiviate or to dissolve the soluble materials or salts combined with the hardened cement. If soluble salts and other soluble substances of organic or inorganic origin or organic or inorganic acids have been mixed with the cement, water alone will produce the desired porosity. If a concentrated solution of a salt has been mixed with the cement, the latter will absorb water of the solution and after setting or hardening the salt is washed out or may be allowed to dissolve out in the electrolyte or in a more or less electrolyzed lye.

Practice has demonstrated that whatever cement is used in the construction of porous cement-diaphragms the latter resist the action of caustic bodies as well as the action of halogen elements, such as chlorine, and retain their porosity.

By the means described a diaphragm for electrolytical purposes is obtained that not only possesses the advantages referred to, but the degree of porosity of which can be readily controlled, that can be obtained cheaply and of any desired form, as in the form of plates, cylinders, &c.

Various substances or bodies as above stated may be employed for the purpose of rendering the cement body more or less porous, thus, for instance, thirty-six liters rock salt may be mixed with sixty-five liters natural or artificial cement, such as lime or magnesium cement, and converted into a plastic state by adding thereto a due proportion of water and then molding into shape. Instead of rock salt, other soluble salts of metals may be used, as for instance, the halogen salts, nitrates, &c. After the molded article has set or become hardened it is removed from the form and the salt is washed out with water. Or fifty liters of a cement such as above referred to may be mixed with thirty-six liters of a solution of rock salt containing about two hundred and fifty grams of the salt per liter, and with fourteen liters hydrochloric acid, the mass being intimately combined, molded into shape and lixiviated after the article has set. Other solutions of salts of metals may be substituted, for the rock salt solution.

The above examples will readily suggest other cement compounds one of the constituents of which may be readily removed either by solution or chemical action, so as to leave the body in a more or less porous condition.

Having thus described my invention, what I claim as new therein, and desire to secure by Letters Patent, is—

1. Diaphragms for electrolytical apparatus composed of a cement adapted to harden or set when combined with water, and of a substance or body soluble in a liquid, substantially as set forth.

2. Diaphragms for electrolytical apparatus composed of a cement adapted to harden or set when combined with water, and of an organic body soluble or destructible in a liquid such as described.

In witness whereof I have hereunto set my hand and seal this 27th day of August, 1892.

AUGUST BREUER. [L. S.]

Witnesses:
 WM. ESSENWEIN,
 RUDOLPH FRICKE.